United States Patent [19]
Kähler

[11] Patent Number: 5,868,889
[45] Date of Patent: Feb. 9, 1999

[54] PROCESS FOR MANUFACTURING A FLUID FILTER

[75] Inventor: Kai Kähler, Hamburg, Germany

[73] Assignee: "Jacobi" Systemtechnik GmbH, Wessig, Germany

[21] Appl. No.: 666,539
[22] PCT Filed: Dec. 30, 1994
[86] PCT No.: PCT/DE94/01556
 § 371 Date: Jun. 28, 1996
 § 102(e) Date: Jun. 28, 1996
[87] PCT Pub. No.: WO95/17942
 PCT Pub. Date: Jul. 6, 1995

[30] Foreign Application Priority Data

Dec. 30, 1993 [DE] Germany .......... 43 45 129.2

[51] Int. Cl.⁶ .......... B01D 27/06; B31F 53/02
[52] U.S. Cl. .......... 156/204; 95/273; 156/210; 156/227; 156/247; 156/474; 210/767
[58] Field of Search .......... 55/521, 497, 486; 210/493.1, 493.3, 493.5, 767; 156/227, 474, 210, 204, 291, 205, 249, 247, 289, 282; 95/273, 286, 287

[56] References Cited

U.S. PATENT DOCUMENTS

| | | | |
|---|---|---|---|
| 2,384,676 | 9/1945 | Hill | 156/205 |
| 2,749,265 | 6/1956 | Fricke et al. | 156/210 |
| 3,358,843 | 12/1967 | Bourdale | 210/493.5 |
| 3,531,920 | 10/1970 | Hart | 55/497 |
| 3,598,689 | 8/1971 | Feffer et al. | 156/249 |
| 3,692,184 | 9/1972 | Miller, Jr. et al. | 210/437 |
| 4,075,106 | 2/1978 | Yamazaki | 156/291 |
| 4,093,482 | 6/1978 | Ogata et al. | 156/210 |
| 4,242,399 | 12/1980 | Fujii | 156/210 |
| 5,609,711 | 3/1997 | Miller | 156/210 |

FOREIGN PATENT DOCUMENTS

| | | |
|---|---|---|
| 0377419 | 7/1990 | European Pat. Off. . |
| 0377420 | 7/1990 | European Pat. Off. . |
| 0382331 | 8/1990 | European Pat. Off. . |
| 3037019 | 6/1982 | Germany . |
| 3903730 | 8/1990 | Germany . |
| 4038966 | 6/1992 | Germany . |
| 4126126 | 2/1993 | Germany . |
| 4206407 | 9/1993 | Germany . |
| 2150461 | 7/1985 | United Kingdom . |

Primary Examiner—Richard Crispino
Attorney, Agent, or Firm—Venable; George H. Spencer; Robert Kinberg

[57] ABSTRACT

A process for manufacturing a fluid filter and a device for carrying out the process in which a fluid-permeable material is pre-folded to form a first filter region including a number of fold walls arranged as substantially zig-zag shaped continuous folds having at least one folded edge portion including a plurality of folded edges. An adhesive is applied in a form of strips or threads to a substantially flat substrate material. The adhesive strips or threads on the substrate material are brought into contact with the folded edge portion in an orientation crossing the folded edges of the folded edge portion for interconnecting the fold walls and so that the substrate material essentially covers the entire folded edge portion. The adhesive is cured for bonding the strips or threads of adhesive to the folded edge portion.

22 Claims, 4 Drawing Sheets

PROCESS FOR MANUFACTURING A FLUID FILTER

BACKGROUND OF THE INVENTION

The invention relates to a process for manufacturing a fluid filter having a first filter region made of a fluid permeable material, including a number of fold walls arranged as a substantially zig-zag shaped continuous fold having at least one folded edge portion including a plurality of folded edges and adhesive interconnecting the fold walls at the folded edge portion.

Fluid filters of the above kind are used to isolate impurities from a fluid passing through them (especially air or industrial gases but basically also liquids). Filter elements are mainly used at present in air filters which are made of micro fibre fleece, especially glass fibres.

In order to increase the effective filter area, with respect to the area of the oncoming flow, of the air filter forming a filter element or a filter region, the filtering medium is folded in a zig-zag fashion so that a number of folds is produced which adjoin one another, via folded edges, through which the medium to be purified passes, at an acute angle to the walls of the folds and transversely to the direction of the folded edges.

Because of material, especially larger particles, depositing on the side of the filter facing the flow and turbulences forming in the oncoming fluid, and because of slight irregularities in the folds etc., there are inhomogeneities in the flow of the fluid passing through the filter which subject the folds arranged in this way to a great mechanical alternating stress and increased flow resistance. Furthermore, the fluid stream, when leaving the filter, is highly turbulent, the flow resistance in successive pipes and the stress on successive components being thereby increased.

In order to keep the folds at a defined spacing from each other and to stabilise the arrangement of folds in the filter inset mechanically, the folds are provided with projections protruding from the plane of the walls thereof, so that the projections of walls adjoining one another abut and the walls support each other as disclosed, for example, in U.S. Pat. No. 3,531,920 or in a special further development described in German Patent Document DE 41 29 126 A1.

It is also known from DE 40 38 966 that separate spacers, which have the same function, may be mounted on top or inserted in the walls of the folds. One variant of the spacers, as mentioned in the above document, and also in German Patent Document DE 30 37 019 A1, may be adhesive members especially in the form of threads. Apart from acting as spacers, they also connect the walls of the folds, thereby further increasing the stability of the filter inset.

Before the filter material is folded, the adhesive is applied onto the flat sheet and the walls of the folds are then stuck together when the adhesive threads come into contact with one another during folding. This solution, therefore, is only suitable for those folds which are packed closely together.

German Patent Document DE 39 03 730 A1 suggests that an adhesive thread, which stabilises and connects the folded layers with one another and which may be attached to the edge region after folding, may be combined with a stamping provided in the fold walls. This solution makes it possible to have larger spacings between the folds. There are, however, still restrictions because of the limited stamping depth of conventional filter materials.

In German Patent Document DE 42 06 407, the edge region of the folds of an already folded sheet of filter material is covered with a fine web of adhesive threads to interconnect the folds and stabilise the filter insert. This solution is not suitable in practice for larger spacings between the folds either, since the fine adhesive web is not able to provide a sufficiently stable connection of widely spaced edges and the web threads begin to "sag", especially when applied from below onto a sheet of folds positioned on top during manufacturing and are no longer in a defined position with respect to the folded edges.

European Patent Document EP 0377 420 A1 discloses an arrangement in which the top and bottom regions of the walls of the folds, each of which have localised adhesive members and are stuck together, are provided additionally with a flat layer of a finely meshed material, while utilising the adhesive provided in the top region, said material serving to render the flow more uniform and further stabilising the filter insert. The document also mentions the possibility of applying such an additional layer of material onto both edge regions of the filter insert. Again, the neutral fixing of the walls of the folds is achieved by the adhesive elements of adjacent walls coming into contact during folding, so that this solution is only suitable for closely packed folds.

SUMMARY OF THE INVENTION

It is an object of the invention to provide a process for manufacturing a filter insert of the above kind suitable for manufacturing, in an efficient manner, mechanically stable filter inserts with a greater spacing of the folds, as well as a device for carrying out this process.

The above and other objects are accomplished in accordance with the invention by the provision of a process for manufacturing a fluid filter, comprising the steps of prefolding a fluid-permeable material to form a first filter region including a number of fold walls arranged as substantially zig-zag shaped continuous folds having at least one folded edge portion including a plurality of folded edges; applying adhesive in a form of strips or threads to a substantially flat substrate material; bringing the strips or threads of adhesive on the substrate material into contact with the folded edge portion in an orientation crossing the folded edges of the folded edge portion for interconnecting the fold walls and so that the substrate material covers essentially the entire folded edge portion; and curing the adhesive for bonding the strips or threads of adhesive to the folded edge portion.

According to a further aspect of the invention there is provided a device for producing a fluid filter having a first filter region made of a fluid permeable material, including a number of fold walls arranged as a substantially zig-zag shaped continuous fold having at least one folded edge portion including a plurality of folded edges, and adhesive threads on a surface of a substrate material being bonded to and crossing the folded edges of the folded edge portion for interconnecting the fold walls and so that the substrate material covers essentially the entire folded edge portion, the device comprising: means for supplying the fluid-permeable material for the first filter region in a processing zone; means for providing fold lines for forming folded edges of the folded edge portion in the fluid-permeable material; means for folding the fluid-permeable material along the fold lines to form the first filter region; means for delivering the substrate material to the processing zone; means for applying adhesive in strips or threads onto a surface of the substrate material; means for bringing the strips or threads of adhesive on the surface of the substrate material into contact with respective folded edges of the folded edge portion and so that the substrate material covers essentially the entire folded edge portion; and means for discharging a combination of the first filter region and substrate material from the processing zone.

The invention is based on the finding that bonding and therefore a stabilisation of widely spaced layers of folds is technically possible by means of adhesive threads applied onto the edge region(s) of layers of folds, if the adhesive threads are first applied onto a flat substrate securing them in their plastic condition, then placed, on this substrate, in contact with the edges of the folds, in a cutting orientation (i.e. crossing the folded edges), hardened or cross-linked, and the substrate is then removed or may be left on the filter insert.

If individual adhesive threads are used, they enclose a constant angle with the edges of the folds or, it the threads are meander-shaped or undulating, an angle changing over the length of the sheet of material.

However, it is also possible to apply a web of cross-linked threads, one part of the threads of the web always crossing the folded edges.

One embodiment in which the layer of the (largely flat) substrate material may be passed by the fluid and left on the edge portion of the folds, when the adhesive is hardened out, has special advantages.

Thus, a layer of material remaining on the folded edge portion near the oncoming flow may act as a second filter region, especially as a pre-filter for the oncoming fluid, and prevent larger particles from entering the actual filter insert. Furthermore, a layer of material remaining on the folded edge portion, near the discharge, may act as a flow stabiliser for the fluid flowing away. The flow stabilizer ray be especially effective if the adhesive is applied in such a thickness that between the first filter region and the flow stabiliser there is a spacing of one tenth to one twentieth of the extent of the first filter region, in the direction of flow.

If the substrate is intended to remain on the gathered folds of the first filter region and act as a second filter region or an a flow stabiliser in the way mentioned above, the material used here may be a fleece-like material or a monofil fabric. In a conventional air filter, this material will have perforations or a mesh width of from 30 to 100 µm and may have fibres, for example, made of glass, ceramics, cellulose, plastic material or mineral substances.

A net- or grid-like material especially made of metal or plastic material is used for a layer acting as a flow stabiliser, or a layer remaining on the first filter region serving primarily as a further mechanical stabiliser or as a grip protection.

As an alternative to using a fluid-permeable material as a substrate for the adhesive threads, a material may be used which, during or after the hardening-out of the adhesive, before use of the filter, is removed again from the folded edge portion in such a way that the adhesive threads remain on the folded edge portion. Such a material may be a plastic film which is wetted by the adhesive in its plastic, non-hardened state, but may be removed therefrom in the semi- or fully-hardened condition without damage. It necessary, this material may also remain on the folds as a grip protection until the filter is finished or even actually used.

A particularly precise positioning of the adhesive threads, with respect to the folded edges, as well as an exact shaping of the threads so that their contour projects above the folded edges, is possible in an embodiment in which the substrate, before the adhesive is applied, is provided with recesses corresponding to the intended position and shape of the adhesive threads.

An additional or alternative version is one in which the folded edges of the portion, on which the adhesive is applied, may also be provided with recesses corresponding to the intended positioning of the adhesive, before application of the substrate with the adhesive threads.

Both embodiments have the advantage that the adhesive may be applied in an exactly calculable amount and with a defined geometry constant over the thread length and identical for several threads.

In accordance with these variants of the process and for carrying out the process, the device of the invention comprises additional stamping tools for stamping recesses and/or elevations into the material for the first filter region and/or tools for stamping recesses to receive the subsequent localised application of adhesive onto the substrate material, for the adhesive threads.

If a substrate is used which must be removed again from the filter insert before use, means are provided for the removal of the substrate from the first filter region during or after the setting of the adhesive.

The above processes may only be used for one folded edge region of the filter insert; however, advantageously, it is also possible to bring both folded edge regions in contact with a substrate provided with adhesive threads or webs. Combining the process with the conventional method may also be of advantage, in that when an adhesive is simultaneously applied from above and below, a substrate is used upon application from below in order to avoid any adhesive dripping down, while the application from above is carried out as usual.

Advantageous further developments of the invention are hereinafter more fully explained by way of example with reference to the drawings which illustrate the preferred embodiment thereof.

DETAILED DESCRIPTION OF THE INVENTION

Figure 1A:
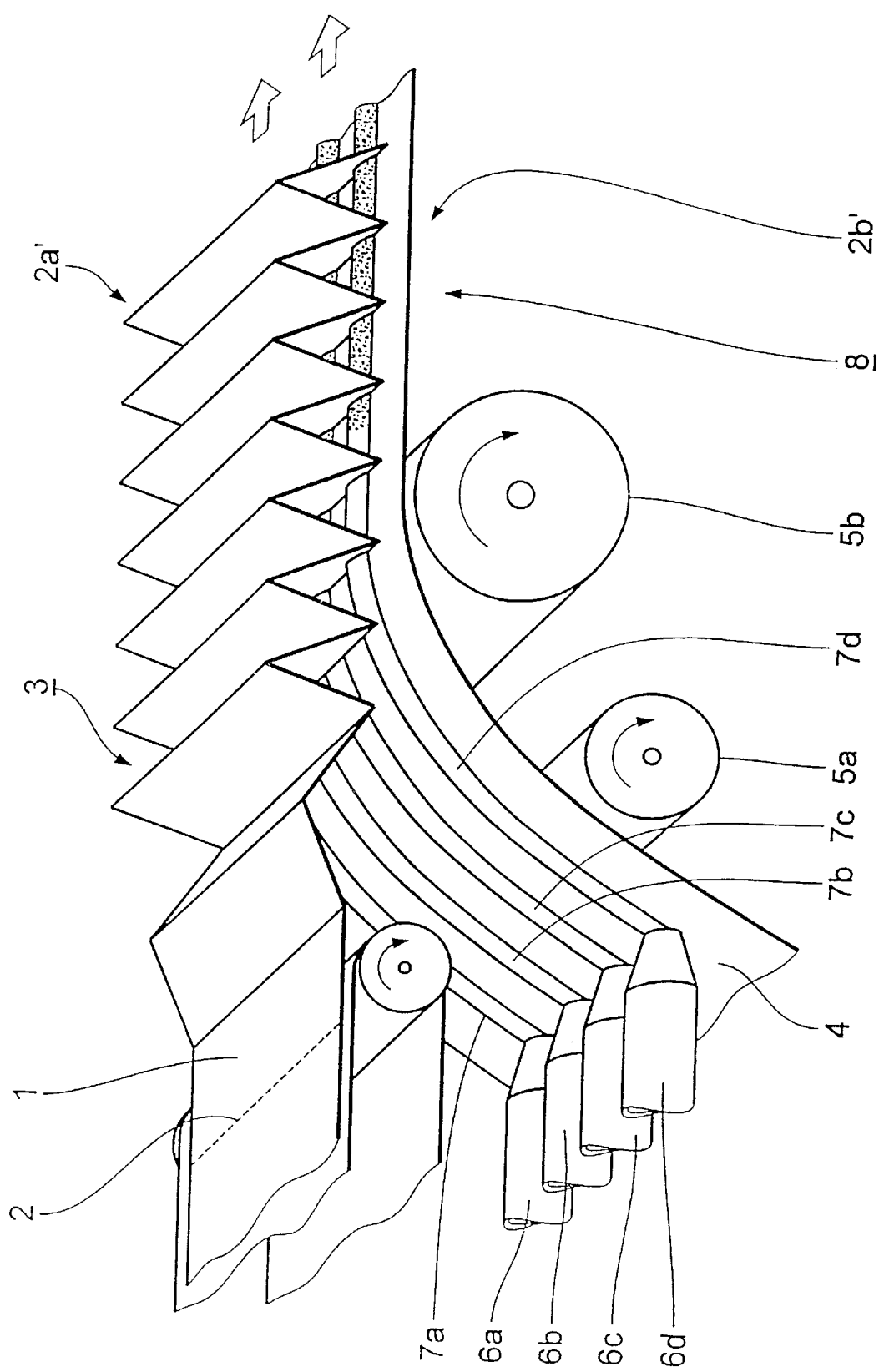
FIGS. 1a and 1b are perspective views showing basic diagrams of the main steps in two variants of the process according to the invention.

FIG. 1a shows, diagrammatically, the process of folding a sheet of filter paper 1, which already has an embossing 2 extending transversely to the length of the sheet, for forming folded edges, so that a package of folds 3 is produced with an upper folded edge portion 2a' and a lower folded edge portion 2b', and of moving the sheet in a direction denoted by the arrows at the right side of the figure.

Together with the filter paper sheet 1, a plastic grid 4 is pushed forward over two rotating rolls 5a and 5b in the same direction and moved until it is only at a small spacing from the lower folded edge portion 2b' of the filter paper sheet 1. Before being guided along, an amount of a pasty adhesive constant per time unit is applied onto the plastic grid 4, within the region of the first roll 5a, from four application modules 6a to 6d.

Because of the forward movement, four adhesive threads 7a to 7d are produced on the plastic grid. These threads come into contact with the folds of the lower folded edge portion 2b' within the region in which the plastic grid 1 runs over the second roller 5b. In so doing, the adhesive partially enters the filter paper and bonds it to the grid sheet 4 which is wide enough to cover essentially the entire lower folded edge portion 2b'. The adhesive hardens within the region beyond the roll 5b (as shown in the figure by the shading of the adhesive threads), and the folded edges of the lower folded edge portion 2b' are therefore firmly bonded by the hardened adhesive, both to one another and to the grid sheet 4.

The plastic grid sheet then remains on the gathered folds 3, both as a substrate and a pre-filter, and forms a filter insert 8 together with the folds.

Figure 1B:
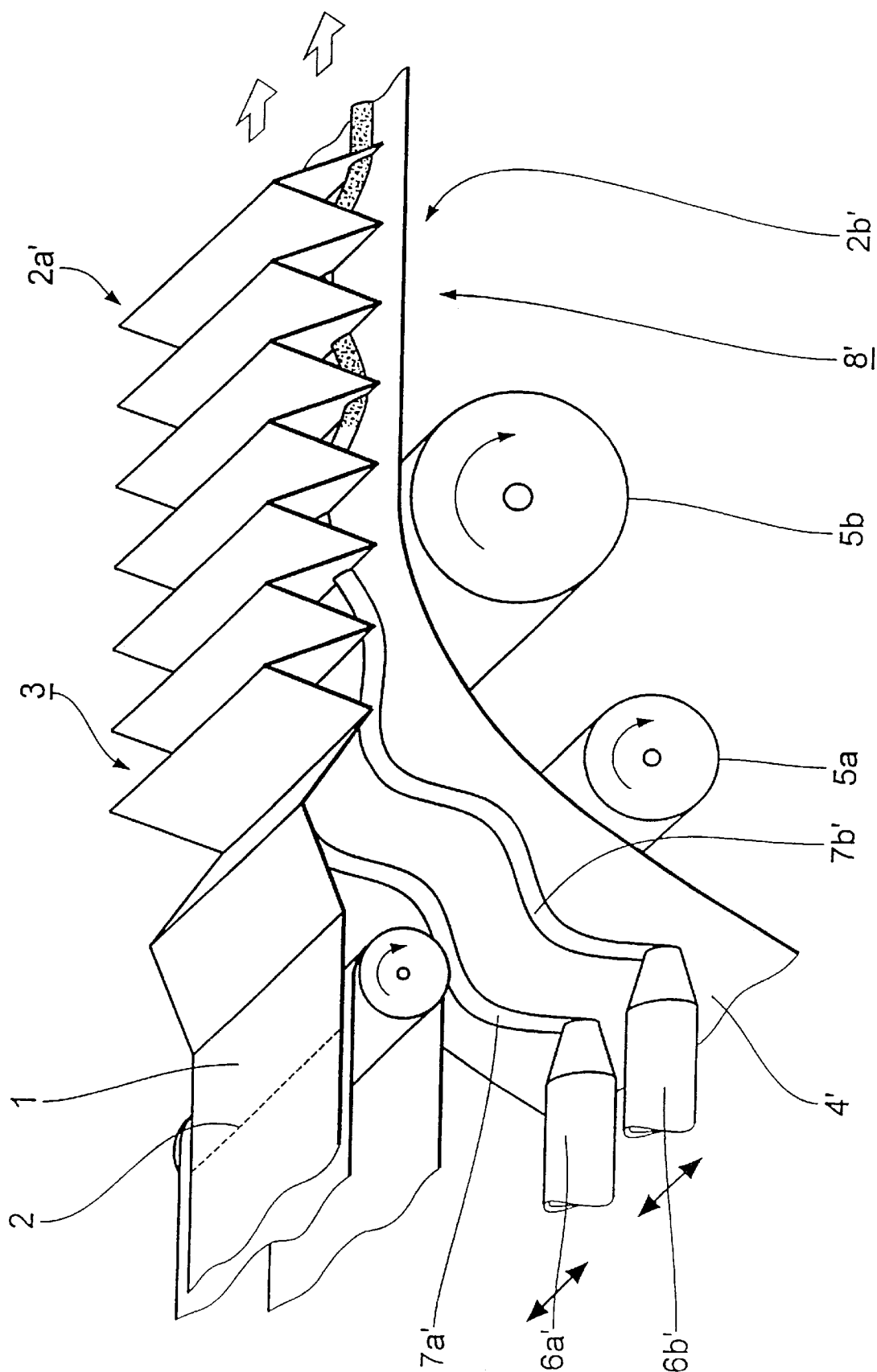

FIG. 1b shows a variant modified with respect to FIG. 1a, in which parts in conformity are denoted by the same reference numerals and the explanation is not repeated. In contrast to FIG. 1a, two adhesive application nozzles 6a' and 6b' are provided which may be regulated in their lateral position, relative to the filter material sheet. These nozzles each apply adhesive path 7a' or 7b' extending in an undulating manner in the longitudinal direction of the sheet onto an impermeable substrate film 4'. The filter insert 8' obtained when the adhesive has hardened may be supplied together with the film 4', attached to the folded edge portion, but the film is peeled off before use of the filter.

Figure 2:
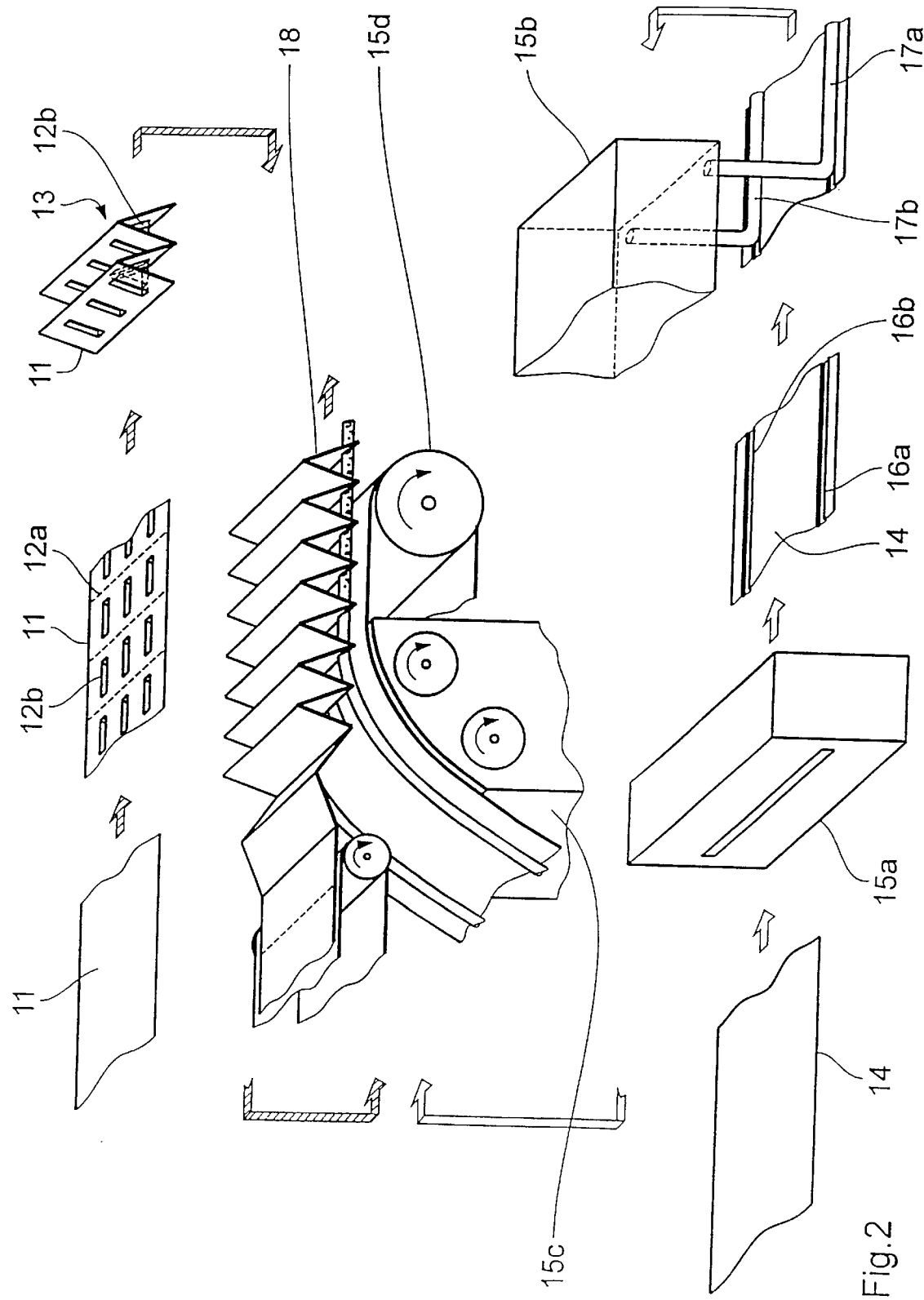
FIG. 2 is an exploded, perspective view showing a flow chart of the main process steps of another variant of the process according to the invention.

FIG. 2 shows the flow of the process steps according to another variant.

Here, a glass fibre fleece 11, provided with recesses 12b in the form of beads which are larger in the longitudinal direction of the sheet and prepressed fold lines 12a, is folded to form a set of folds 13, the bead-like recesses 12b of adjacent folded walls coming to rest against one another and mutually supporting the folded walls.

In a scoring machine 15a, a plastic sheet 14 is provided with grooves 16a and 16b which extend along the sheet and have a semi-circular cross-section. A semi-fluid thermoplastic material is applied into these grooves by means of a metering device so that a bead 17a or 17b is formed which slightly projects from the groove.

The plastic film with the adhesive beads is then supplied to a pressure and cooling device 15c with pressure wheels shaped according to the position and the cross-section of the grooves 17a and 17b, in which device, the sheet is pressed against the lower folded edge portion of the set of folds 13 and cooled. Here, the plastic threads solidify, and the folded edges engaging in the threads, which are initially still in the plastic state, upon pressing the film against the surface thereof, are now interconnected by the solidified threads to form a stabilised filter insert 18.

Thereupon, in a tightening device 15d, the plastic film is removed from the filter insert 18 which has been moved further forward, and is wound up, the filter element thus being insertable.

Figure 3:
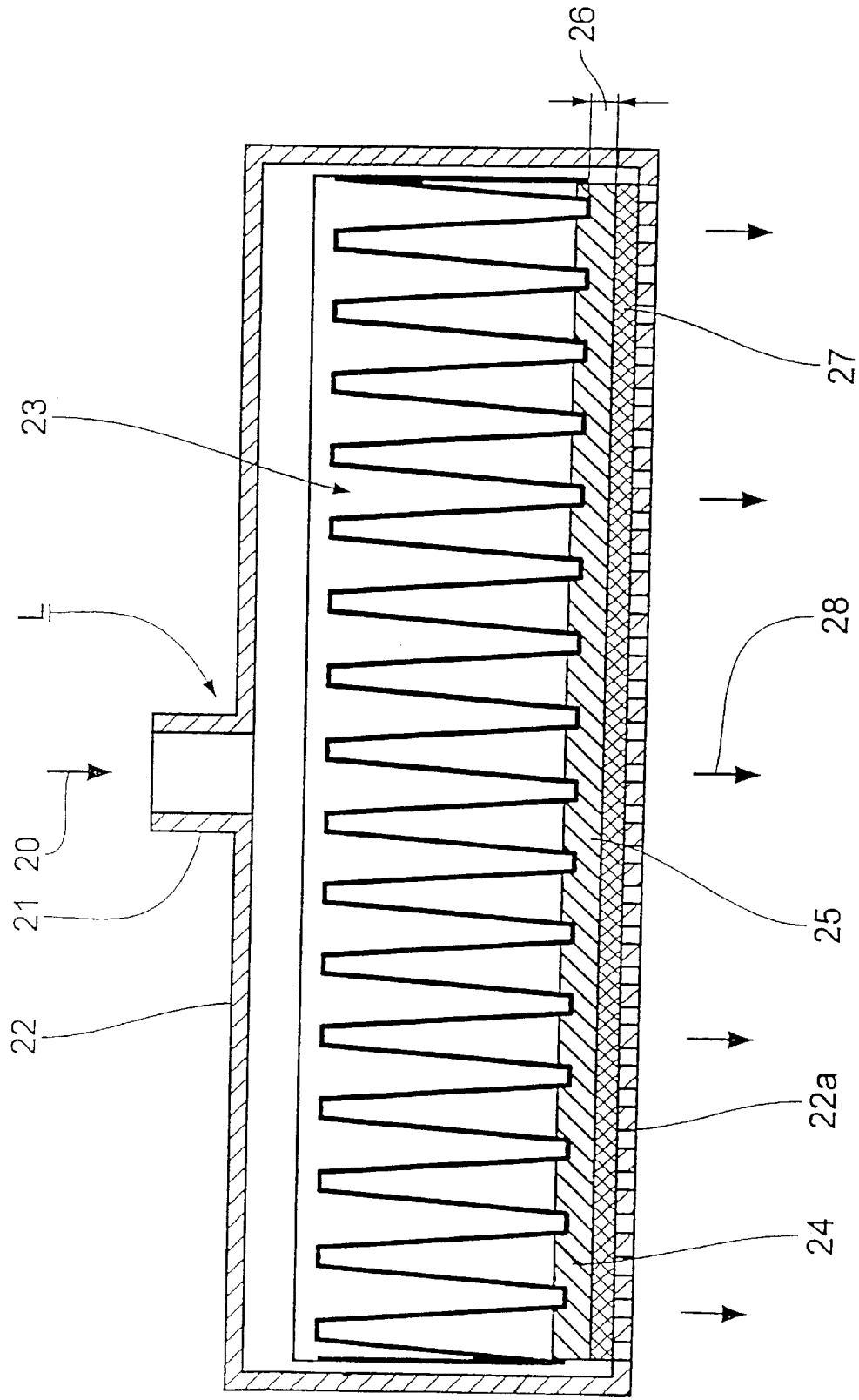
FIG. 3 a schematic cross-sectional representation of a filter produced by a process variant according to the invention.

FIG. 3 shows a simplified cross-sectional view of an air filter with integrated flow stabiliser produced according to one variant of the process of the invention.

The air filter L shown in FIG. 3 is of a substantially cuboid construction. The inflow of air 20 to be purified is induced from the filter top, via a suction connection 21. A filter insert 23 arranged in a filter housing 22 comprises a filter element made of glass fibre fleece and having a number of zig-zag folds, and the edge region 24, near the discharge end, of the filter element which extends over the expanded polyurethane PU beads 25 (one at which is shown in the figure in cross-section), at right angles to the folded edges, is connected with a flow stabiliser 27 made of a plastic fibre fleece with a "mesh size" of from 30 to 100 μm, via a gap 26 of height X formed by these relatively thick beads. The flow stabiliser 27 rests on the inside of the lower expanded metal surface 22a of the filter housing 22. The height X is about one tenth to one twentieth of the length of the filter insert, in the flow direction of the air 20 to be purified.

The oncoming air reaches the inlet side of the filter insert 23 through connection 21 and enters the filter fleece of flow stabiliser 27 while the suspended matter is discharged, the geometry of the filter and the variations in the deposits in the individual folds resulting in an inhomogeneous flow related to the effect of tensile and pressure forces acting upon the filter insert. The position of the folds is stabilised with respect to these forces by the pointwise fusion of the folded edges with the PU beads 25 and, via these, with the plastic fibre fleece of flow stabiliser 27. In the gap 26, the different speed components of the discharging air 28 are balanced out, thereby achieving stabilisation on the inlet side and thus a decrease in the mechanical stress of the filter insert.

Advantageously, the air discharged from the air filter, after passing the flow stabiliser 27, has a more or less laminar flow resulting in a considerable decrease in the flow resistance of the air filter and a lowering of the noise formation when operating the filter.

Depending on the actual application, a structure may also be used for the flow stabiliser 27 which is of a grid-like or a laminar construction and whose apertures are oriented in the direction of flow. Porous structures such as membranes with openings within the direction of flow are also suitable.

The expanded metal plate supporting the flow stabiliser may easily be pushed into two profiled strips provided on the side walls of the filter housing, at right angles to the direction of the flow of the air to be purified, and locked in this position. In this way, the filter insert with the expanded or bonded flow stabiliser may easily be removed and exchanged.

Using a method which is largely analogous to that shown in FIG. 3, an air filter may be constructed with an integrated pre-filter, the integral construction naturally being on the inlet side of the folded filter insert.

The adhesive used according to the invention includes any substance enabling a material connection between the substrate and the folded filter region and hardening or solidifying during or after the connection. Depending on the filter and substrate material in question, they may include single or two-component adhesives, air-hardening thermoplastic materials or expanded materials etc. The connection of filter material and plastic threads may also be achieved by a (pointwise) welding of the folded edges to the plastic threads.

The folds of the actual filter element need not be strictly in a zig-zag shape; the folds may, in particular, also have a trapezoidal connection, thus advantageously increasing the contact surface between the walls of the folds and the adhesive threads.

The invention is not restricted in its configuration to the preferred example specified above. Rather, a number of variants which make use of the solution described are conceivable, even in the case of configurations of a fundamentally different type.

I claim:

1. A process for manufacturing a fluid filter, comprising the steps of:

pre-folding a fluid-permeable material to form a first filter region including a number of fold walls arranged as substantially zig-zag shaped continuous folds having at least one folded edge portion including a plurality of folded edges;

applying adhesive in a form of strips or threads to a substantially flat substrate material;

bringing the strips or threads of adhesive on the substrate material into contact with the folded edge portion in an orientation crossing the folded edges of the folded edge portion for interconnecting the fold walls and so that the substrate material covers essentially the entire folded edge portion; and bonding the strips or threads of adhesive to the folded edge portion.

2. The process according to claim 1, wherein the substrate material is permeable for the fluid to be filtered, and further including maintaining the substrate material on the folded edge portion after the adhesive has cured.

3. The process according to claim 2, including leaving the substrate material on the folded edge portion of the first filter region to form a second filter region to pre-filter an oncoming fluid.

4. The process according to claim 2, including leaving the substrate material on the folded edge portion of the first filter region to form a flow stabilizer for fluid flowing away from the first filter region.

5. The process according to claim 2, wherein the maintaining step includes maintaining the substrate material on the first filter region as a grip protection.

6. The process according to claim 5, wherein the substrate material comprises one of a mesh and grid material made of one of a metal and plastic.

7. The process according to claim 1, wherein the bringing step includes bringing the threads or strips of adhesive into contact with the folded edge portion when the adhesive is not yet hardened, and hardening the adhesive upon contact with the folded edge portion.

8. The process according to claim 1, wherein the substrate material in the applying step comprises at least one of a fleece material and a monofil fabric.

9. The process according to claim 8, wherein the fleece material or monofil fabric has a mesh width size of from about 30 to about 100 $\mu$m.

10. The process according to claim 8, wherein the fleece material or monofil fabric comprises fibres made from at least one of glass, ceramics, cellulose, plastic material and mineral substances.

11. The process according to claim 1, and further comprising removing the substrate material from the folded edge portion during or after hardening of the adhesive so that the adhesive remains on the folded edge portion.

12. The process according to claim 11, wherein the substrate material used in the applying step comprises a plastics material which is wetted by the adhesive and is removable from the adhesive in the semi-hardened or hardened state of the adhesive without damage.

13. The process according to claim 1, wherein the applying step includes applying the adhesive in strips or threads that have a substantially constant spacing from one another.

14. The process according to claim 1, further including providing the substrate material with recesses, before the applying step, in locations intended for the strips or threads of adhesive applied during the applying step.

15. The process according to claim 1, further including providing the folded edge portion with recesses, before the applying step, in locations intended for the strips or thread, of adhesive applied during the applying step.

16. The process according to claim 1, wherein the first filter region contains opposing folded edge portions and further including the step of bringing each folded edge portion of the first filter region into contact with one layer of a substrate material.

17. A method of utilizing a fluid filter manufactured according to the process of claim 3, including subjecting the substrate of the second filter region to an oncoming fluid so that the substrate operates as a pre-filter for the oncoming fluid which subsequently passes through the first filter region.

18. A method of utilizing a fluid filter manufactured according to the process of claim 4, including orienting the fluid filter so that a fluid to be filtered first passes through the first filter region and operating the second filter region as a flow stabilizer for fluid flowing away from the first filter region.

19. A device for producing a fluid filter having a first filter region made of a fluid permeable material, including a number of fold walls arranged as a substantially zig-zag shaped continuous fold having at least one folded edge portion including a plurality of folded edges, and adhesive threads on a surface of a substrate material being bonded to and crossing the folded edges of the folded edge portion for interconnecting the fold walls and so that the substrate material covers essentially the entire folded edge portion, the device comprising:

means for supplying the fluid-permeable material for the first filter region in a processing zone;

conveyor means for folding the fluid-permeable material along pre-pressed fold lines to form the first filter region;

means for delivering the substrate material to the processing zone;

means for applying adhesive in strips or threads onto a surface of the substrate material;

means for bringing the strips or threads of adhesive on the surface of the substrate material into contact with the folded edge portion of the first filter region so that the substrate material covers essentially the entire folded edge portion; and means for discharging a combination of first filter region and substrate material from the processing zone.

20. The device according to claim 19, further including means for stamping at least one of recesses and elevations into the fluid-permeable material upstream of the folding means.

21. The device according to claim 19, and further including means for stamping recesses into the substrate material for receiving the adhesive strips or threads.

22. The device according to claim 19, further including means for removing the substrate material from the first filter region during or after a curing of the adhesive.

* * * * *